United States Patent [19]
Barrera et al.

[11] 3,818,877
[45] June 25, 1974

[54] SIGNAL GENERATING PROCESS FOR USE IN ENGINE CONTROL

[75] Inventors: Carlos M. Barrera, Detroit; Clarence C. Stark, Plymouth; Frederick L. Zeisler, Livonia. all of Mich.

[73] Assignee: Ford Motor Company, Dearborn, Mich.

[22] Filed: Aug. 24, 1972

[21] Appl. No.: 283,604

[52] U.S. Cl........ 123/32 EA, 123/119 R, 73/194 B, 73/194 A
[51] Int. Cl............................................. F02b 3/00
[58] Field of Search.................. 123/32 AC, 32 EA; 73/194 C, 194 E, 194 A, 194 B

[56] References Cited
UNITED STATES PATENTS

| | | | |
|---|---|---|---|
| 3,386,287 | 6/1968 | Hurvitz | 73/194 C |
| 3,616,693 | 11/1971 | Burgess | 1/1 |
| 3,732,854 | 5/1973 | Murtin | 123/32 EA |

Primary Examiner—Laurence M. Goodridge
Assistant Examiner—Ronald B. Cox
Attorney, Agent, or Firm—Keith L. Zerschling; Robert W. Brown

[57] ABSTRACT

Described is a process for generating a signal for use in engine control. The process generates an electrical signal indicative of the amount of air entering a spark ignition internal combustion engine. The engine includes at least one combustion chamber and has a conduit for conveying air thereto. The process includes the step of partially obstructing the flow of air through the conduit during operation of the engine thereby causing the formation of vortices in the air flowing through the conduit. An electrical signal is generated, and this electrical signal is modulated at a rate proportional to the rate at which the vortices are formed. The characteristics of the modulated electrical signal are indicative of the volumetric air flow rate. This signal or a signal derived therefrom may be adjusted to provide a signal indicative of the mass rate of air flow through the conduit. The mass air flow signal is applied to means for controlling the amount of fuel metered to the engine.

1 Claim, 7 Drawing Figures

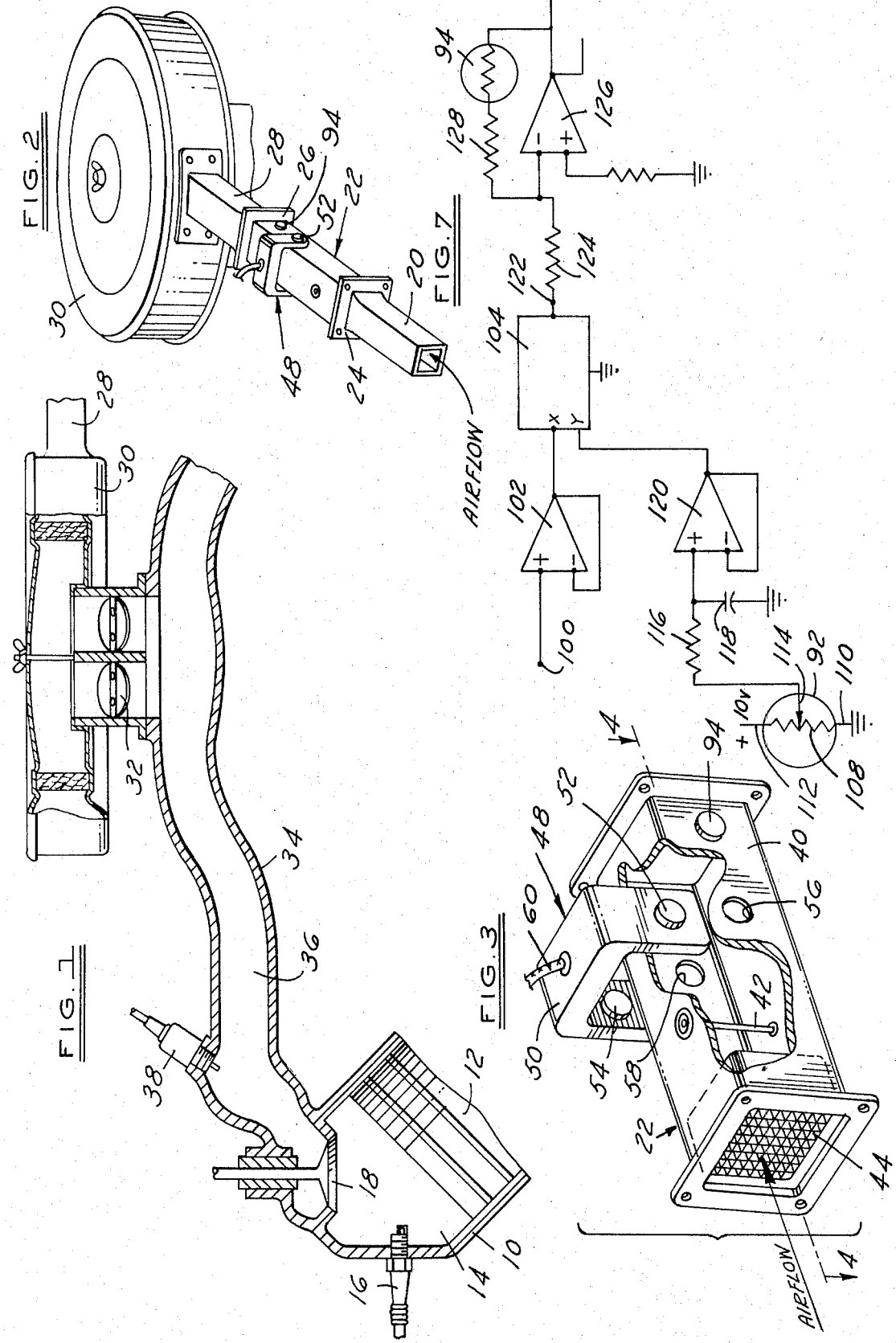

SIGNAL GENERATING PROCESS FOR USE IN ENGINE CONTROL

BACKGROUND OF THE INVENTION

This invention relates to a process for generating a signal for use in the control of a spark ignition internal combustion engine having at least one combustion chamber and having a conduit for conveying air to the combustion chamber. The generated signal is electrical in nature and is used to control on a continuous basis the amount of fuel metered to the engine. A vortex-shedding flow meter is utilized in the generation of an electrical signal indicative of the amount of air entering the engine.

During the last several decades, many attempts have been made to measure continuously the amount of air entering a spark ignition internal combustion engine and to control as a result of this measurement the amount of fuel metered to the engine. This is particularly true with respect to fuel-injected engines. Such attempts to measure either directly or indirectly and continuously the amount of air entering the engine have included the use of anemometers of various types. Among these are the rotating vane, the hot film anemometer, thermistors or other variable resistance elements positioned in the intake manifold and connected in electrical circuit to indicate air velocity, and venturi configurations for generating a differential pressure signal indicative of air flow rate. Most, if not all, commercially available fuel-injected spark ignition internal combustion engines utilize the continuous measurement of intake manifold vacuum to control the amount of fuel metered to the engine. Generally, these devices have been found to be expensive, unreliable, lacking in durability in an automotive environment or inaccurate.

SUMMARY OF THE INVENTION

The process of the present invention utilizes the phenomenon, well known to those familiar with fluid mechanics, of vortex-shedding. Vortex-shedding occurs during fluid flow over a range of Reynolds numbers when the fluid flow is partially obstructed by a body positioned in the flow path, for example, by a cylindrical rod having its axis positioned perpendicularly with respect to the path of fluid flow. The vortex-shedding phenomenon is described in many textbooks on fluid mechanics. Such textbook treatment is exemplified by the book by R. C. Binder, "Fluid Mechanics," published by Prentiss-Hall, Incorporated, Englewood Cliffs, N.J., 1962, pages 141-142.

The use of the vortex-shedding phenomenon to generate an electrical signal indicative of fluid velocity or volumetric flow rate is well known in the art as may be seen in U.S. Pat. No. 3,680,375 issued Aug. 1, 1972, to Joy et al. entitled "Sonic Velocity Sensing". The novel process of the invention concerns the application of the vortex-shedding phenomenon to the control of a spark ignition internal combustion engine.

In accordance with the invention, a process for generating a signal for use in the control of a spark ignition internal combustion engine having at least one combustion chamber and having a conduit for conveying air to the combustion chamber includes the steps of partially obstructing the flow of air through the conduit during the operation of the engine thereby to cause the formation of vortices in the air flowing through the conduit, generating an electrical signal, modulating the electrical signal or a signal derived from it in a manner corresponding to the rate at which the vortices are formed, and applying the modulated electrical signal or signal derived from it to a device for controlling the amount of fuel metered to the engine. Preferably, the process includes the step of adjusting the modulated electrical signal, or electrical signal derived from it, for changes in the pressure and/or temperature of the air flowing through the conduit. This provides an electrical signal for application to the device for controlling fuel metering that is indicative of the mass of the air flowing through the conduit. Fuel may then be proportioned in accordance with this mass of air to achieve a desired air-fuel ratio for optimum engine operation.

The inventive process will be better understood from the detailed description which follows and from the drawings.

BRIEF DESCRIPTION OF THE DRAWINGS

FIG. 1 is a digrammatic sectional view of a combustion chamber and intake conduit of a spark ignition internal combustion engine;

FIG. 2 is a pictorial view of a portion of the air intake conduit for the engine of FIG. 1 and includes apparatus for utilizing the vortex-shedding phenomenon to generate a signal for use in the control of the spark ignition internal combustion engine;

FIG. 3 is an exploded pictorial view of the vortex-shedding apparatus shown in FIG. 2;

FIG. 7 is a schematic diagram of a circuit corresponding to several of the blocks shown in the block diagram of FIG. 5.

DETAILED DESCRIPTION OF THE INVENTION

Figure 4:
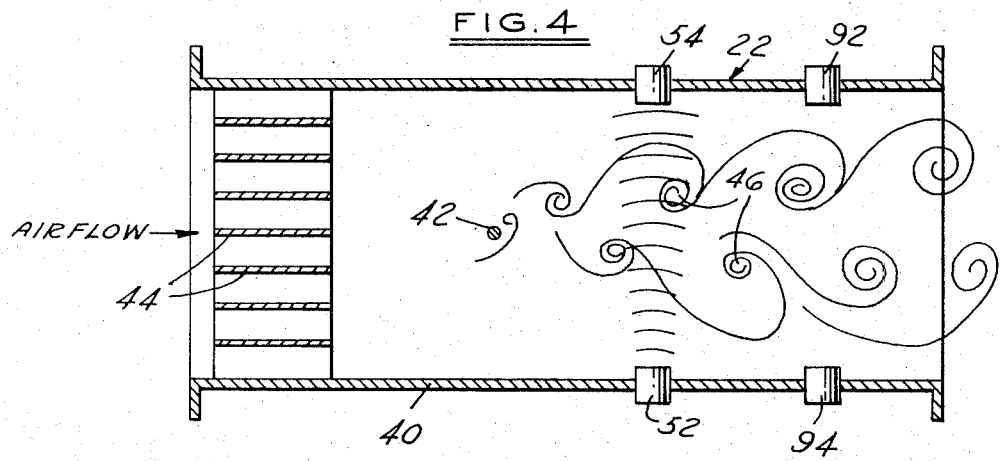
FIG. 4 is a sectional view of the vortex-shedding apparatus, the section being taken along the line 4—4 in FIG. 3.

With reference now to the drawings, wherein like numerals refer to like parts in the several views, and in particular to FIGS. 1 through 4, there is shown in simplified form apparatus that can be used to carry out the inventive process.

FIG. 1 shows a cylinder 10 in which a piston 12 is movably positioned to form a combustion chamber 14 of a spark ignition internal combustion engine. A spark plug 16 is positioned within the combustion chamber 14 to ignite a mixture of air and fuel therein. A conventional poppet valve 18 is used to admit air and fuel to the combustion chamber 14.

A conduit is used to convey air from the atmosphere to the combustion chamber 14. This conduit, which to be seen in its entirety requires reference to both FIGS. 1 and 2, comprises a duct 20 open to atmospheric air, an air flow sensor 22 connected at its end 24 to the duct 20 and at its end 26 to another duct 28. The duct 28 forms the air intake opening for an air cleaner 30 of conventional construction. The air cleaner 30 is positioned over a butterfly air throttle valve 32 that is employed to variably control the amount of air entering an intake manifold 34. A passage 36 in the intake manifold 34 is used to convey air to the combustion chamber 14. A fuel injector 38, which may be electromagnetically operated, is mounted in the intake manifold 34 and is used to inject fuel into the air in the passage 36 during engine operation.

It should be noted that the air flow sensor 22 is located upstream of the air valve 32. Air temperature and pressure downstream of the air throttle 32 are subject to considerable fluctuation during engine operation, but air temperature and pressure upstream of the air throttle 32 are at or near ambient levels and do not fluctuate greatly.

FIGS. 3 and 4 illustrate the air flow sensor 22 in greater detail. The air flow sensor 22 comprises a housing 40 that has a substantially rectangular cross-section, but other configurations may be used. The housing 40 has a cylindrical rod 42 positioned within it. Air enters the air flow sensor 22 at the left as viewed in FIGS. 3 and 4. A flow straightener 44 helps remove air swirl at the input to the flow sensor and tends to equalize the velocity distribution of the air in the region upstream of the rod 42.

The rod 42 partially obstructs the flow of air through the air flow sensor 22. For a given rod diameter, there exists a range of air velocity within the housing 40 throughout which vortices are formed in the moving air stream. The vortices 46 may best be seen in FIG. 4. They originate at the rod 42 when the boundary layer of air on the rod 42 separates from it. As is depicted in FIG. 4, the vortices are alternately formed on opposite sides of the rod 42 and grow larger as they progress downstream. The rate at which these vortices are formed is directly proportional to the velocity of the air within the air flow sensor 22, that is, the number of vortices formed increases with increasing air velocity. Because the housing 40 is of fixed cross-section, the rate at which the vortices 46 are formed is also proportional to the volumetric flow rate of the air passing through the air flow sensor 22. In summary, the flow of air through the sensor 22 is partially obstructed by a body 42 that is positioned perpendicularly to the direction of air flow. This partial obstruction causes the formation of vortices at a rate proportional to the air flow velocity and volumetric flow rate. A cylindrical body 42 is illustrated, but other configurations capable of producing the vortex-shedding phenomenon are known.

The air flow sensor 22 includes an electrically excitable ultrasonic transmitter-receiver combination generally identified by the numeral 48. The ultrasonic transmitter-receiver 48 may include a U-shaped support structure 50 having an ultrasonic transmitter sensor 52 positioned in one of its legs and having an ultrasonic receiver sensor 54 positioned in its opposite leg. The transmitter sensor 52 is located in alignment with an opening 56 in one wall of the housing 40, and the receiver sensor 54 is located in alignment with an opening 58 in the opposite wall of the housing 40. This permits sonic waves to be transmitted from the transmitter sensor 52 across the housing 40 to the receiver sensor 54. The sonic waves travel in a direction that is perpendicular to both the rod 42 and the direction of the air flow through the housing 40. Typically, the transmitter-receiver sensors 52 and 54 are positioned downstream of the rod 42 a distance of about 2 to 10 rod diameters.

Both the transmitter sensor 52 and the receiver sensor 54 may be made from piezoelectric crystals. Ultrasonic waves transmitted by the transmitter sensor 52 are modulated at a rate or frequency determined by the rate at which the vortices 46 are formed, and the modulated sonic waves are then received by the receiver sensor 54 which converts the modulated sonic waves to a corresponding electrical signal. A package of electrical leads 60 may be provided for the electrical excitation of the piezoelectric transmitter sensor 52 and for conveying the modulated electrical signal from the piezoelectric receiver sensor 54.

Figure 6:
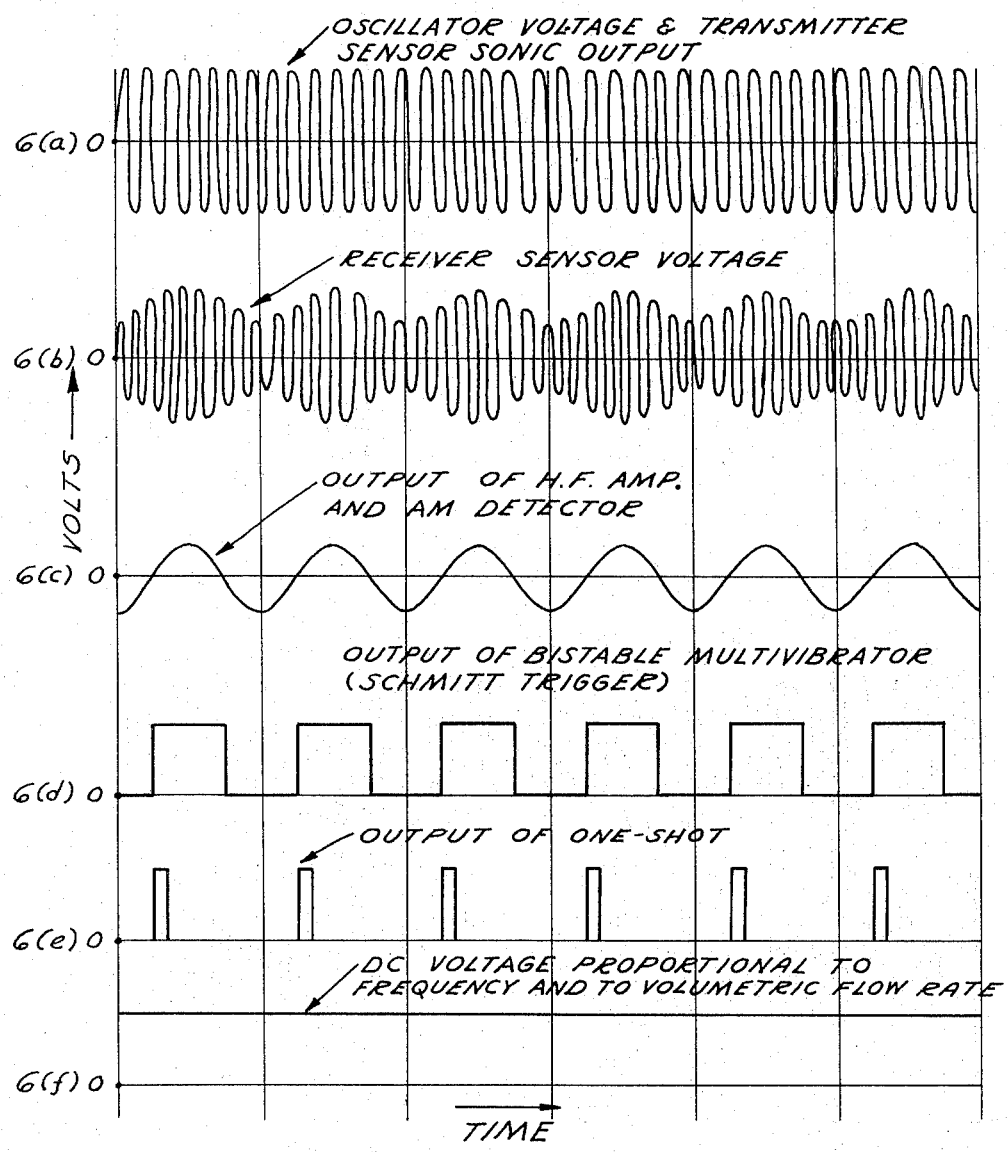
FIG. 6 illustrates waveforms at various points in the electrical block diagram of FIG. 5.
Figure 5:
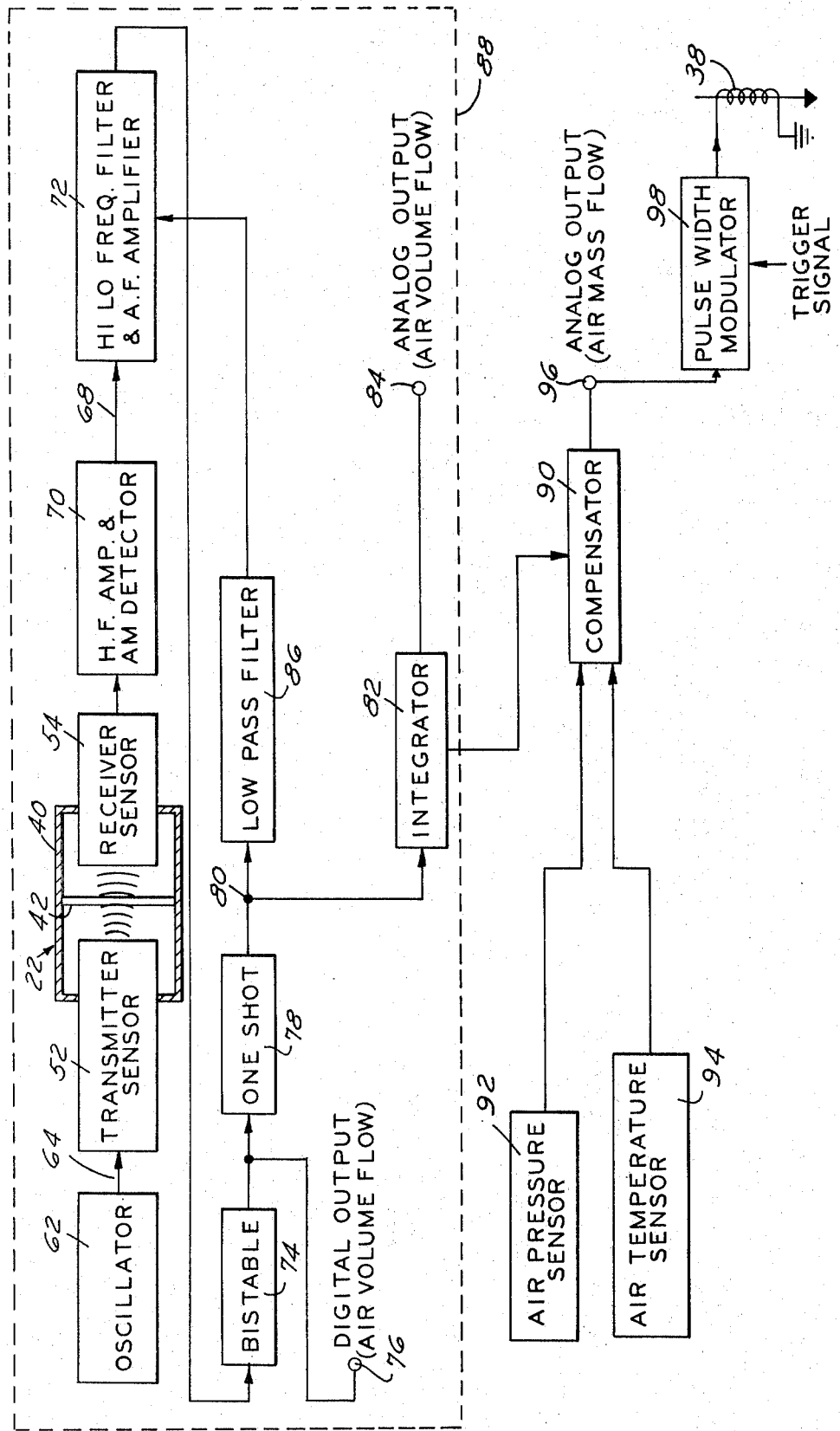
FIG. 5 is an electrical block diagram of circuitry for generating a signal for use in the control of a spark ignition internal combustion engine.

With particular reference now to FIGS. 5 and 6, there is shown an electrical block diagram, with associated waveforms, of circuitry required to generate an electrical signal for use in the control of a spark ignition internal combustion engine. An electrical oscillator 62 generates at 64 a signal having the waveform shown in FIG. 6(a). This signal perhaps is best described as a carrier signal having a frequency of, for example, 200 kilohertz. The output 64 of the oscillator 62 is applied to the piezoelectric transmitter sensor 52 which produces mechanical vibrations corresponding in frequency with the oscillator signal. The mechanical vibrations of the transmitter sensor 52 produce the previously described sonic waves within the air flow sensor 22 that are transmitted to the receiver sensor 54. During the course of their passage through the air flow sensor 22, the sonic waves are modulated by vortices formed within the air flow sensor 22 during the operation of the spark ignition internal combustion engine. The modulated sonic waves produce corresponding mechanical vibrations in the piezoelectric receiver sensor that are converted by it to corresponding electrical signals having the waveform shown in FIG. 6(b). This waveform 6(b) is an amplitude-modulated signal that is applied at 66 to a high frequency amplifier and amplitude modulation detector 70. The high frequency amplifier, which preferably is equipped with automatic gain control, amplifies the amplitude-modulated electrical signal and removes the carrier frequency to produce at 68 an audio or lower frequency signal having the waveform shown in FIG. 6(c).

The audio frequency signal at 68 is fed into a high-low frequency filter and audio-frequency amplifier 72. The output of the filter and audio-frequency amplifier 72 is fed into a bistable multivibrator 74, which may be of the Schmitt trigger variety. The waveform of FIG. 6(c) has a frequency proportional to the rate at which the vortices 46 are formed in the air flow sensor 22 which, in turn, is proportional to the volumetric air flow rate as previously described. The bistable multivibrator 74 converts the signal of FIG. 6(c) to a square wave or pulsating signal as shown in FIG. 6(d). Thus, the output signal at point 76 is a series of pulses having a repetition rate proportional to the rate or frequency at which the vortices 46 are formed and, hence, proportional to volumetric air flow rate.

The signal obtained from the bistable multivibrator 74 may be fed to a one-shot or monostable multivibrator 78 to produce at 80 the waveform shown in FIG. 6(e). The pulses shown in FIG. 6(e) are of fixed width, but the rate at which they occur is proportional to the rate at which the vortices 46 are formed. These pulses may be fed into an integrator 82 to produce at 84 a DC voltage proportional to pulse frequency and also to air volumetric flow rate, as is shown in FIG. 6(f). The pulses occurring at point 80 may also be fed through a low pass filter 86 to the high-low frequency filter and audio-frequency amplifier 72 to facilitate its operation.

Electronic equipment capable of performing the functions contained within the broken lines 88 of FIG. 5 has been obtained under the designation of model number VA-200-2 from J-Tec Associates, Inc. 317 7th Avenue South East, Cedar Rapids, Iowa 52401. This company is engaged in the manufacture of vortex-shedding anemometers.

As was previously stated, the output at point 80 in FIG. 5 is a digital signal having a pulse repetition rate proportional to volumetric air flow rate, and the output of the integrator 82 is an analog DC signal having a voltage level proportional to volumetric air flow rate. For the purpose of controlling a spark ignition internal combustion engine, it is desirable to produce an electrical signal proportional to mass air flow rate rather than to volumetric air flow rate. For this reason, the signal from the integrator 82 is fed into a compensator 90. The compensator 90 utilizes an air pressure sensor 92 and an air temperature sensor 94 to adjust the analog DC output voltage from the integrator 82 for changes in air pressure and air temperature. Preferably, the air pressure and temperature sensors 92 and 94 are located in or near the air flow sensor 22.

The compensator 90 has an analog output at 96 that is proportional to mass air flow rate. This signal proportional to mass air flow rate is applied to a device for controlling the amount of fuel metered to the spark ignition internal combustion engine. The controlled device, for example, may comprise a pulse width modulator 98 that, in the well known manner, produces pulses of varying width that, in turn, are applied to the electromagnetically-controlled fuel injector 38. Of course, a means for triggering the pulse width modulator in synchronism with engine speed is employed. An electronic carburetor or other fuel metering device can be used as the controlled device.

FIG. 7 illustrates circuitry which may be used to perform the functions of the air pressure sensor 92, the air temperature sensor 94, and the compensator 90.

A volumetric air flow rate can be converted to a mass flow rate by changing the volumetric flow rate to an equivalent volumetric flow rate at standard conditions of temperature and pressure and then by multiplying this equivalent by the density of air at such standard conditions. This may be expressed mathematically as follows:

$$Q_m = Q_v \times P/14.7 \text{ psia} \times 530/T \text{ (°R)}$$

where $Q_m$ is the mass flow rate, $Q_v$ is the actual volumetric flow rate, $P$ is the actual pressure of the flowing air, 14.7 psia is standard pressure, 530° R is standard temperature and $T$ is the actual temperature in degrees Rankin. The density of air at standard temperature is of course, a constant and can be taken into account in the scaling of the electronic components. The circuitry of FIG. 7 is designed to multiply the air volumetric flow signal from the integrator 82, which is applied at the terminal 100, first by the ratio of the actual pressure to standard pressure and then by the ratio of the standard temperature (530° R) to the actual temperature. To accomplish this, the volumetric flow rate signal at the terminal 100 passes through a unity gain isolation amplifier 102, the output of which is applied to the X terminal of a multiplier 104.

The ratio of the actual pressure to standard atmosphere pressure (14.7 psia) is obtained from the pressure sensor 92. The pressure sensor 92 may comprise a voltage divider that includes a resistive element 108 having one of its terminals connected to ground at 110 and its other terminal connected at 112 to a source of electrical DC voltage, for example, 10 volts. The pressure sensor may have a practical range from 8 to 16 psia representing altitudes from 14,000 feet to below sea level, and 16 psia may correspond to the 10 volt position of the arm 114 movable along the resistance element 108. A Trans-Sonics Type 1107 pressure sensor may be used. The voltage on the movable arm 114 is representative of the ratio of the actual pressure to standard atmospheric pressure and is applied, through a filter comprised of a resistor 116 and a grounded capacitor 118, to the input of a unity gain isolation amplifier 120, the output of which is connected to the Y input of the multiplier 104.

The output of the multiplier 104 is taken at the terminal 122 and is the product of the volumetric air flow rate and the aforedescribed pressure ratio. The signal at the terminal 122 is applied through an input resistor 124 to the input terminal of an operational amplifier 126. The feedback resistance of the amplifier 126 is comprised of a resistor 128 and a series-connected thermistor 130, which may be a Yellow Springs Inst. Co. "Thermolinear" thermistor. The gain of the amplifier 126 is determined by the value of the feedback resistance and the input resistance 124. Because the thermistor 130 has a negative temperature coefficient and is positioned to sense the actual temperature of the air, the gain of the amplifier 126 varies with changes in air temperature. Thus, the signal from the amplifier 126 at its output terminal 96 is proportional to mass air flow rate. As was previously described, this mass air flow signal is applied to a device for controlling the amount of fuel metered to the spark ignition internal combustion engine.

Based upon the foregoing description of the invention what is claimed and desired to be protected by letters Patent is:

1. A process for generating a signal for use in the control of a spark ignition internal combustion engine having at least one combustion chamber and having a conduit for conveying air to said combustion chamber, said process comprising the steps of: partially obstructing the flow of air through said conduit to said combustion chamber during the operation of said engine thereby causing the formation of vortices in the air flowing through said conduit; generating a first electrical signal which has an amplitude which varies with the rate at which said vortices are formed, said amplitude of said first electrical signal being proportional to the volumetric flow of air through said conduit; applying said first electrical signal to one input to an electronic multiplier; generating a second electrical signal having an amplitude proportional to the ratio of the pressure of air flowing through said conduit to the pressure of air at standard conditions (14.7 psia); applying said second electrical signal to another input to said electronic multiplier to produce a third electrical signal at the output of said multiplier, said third electrical signal having an amplitude proportional to the product of said first and second electrical signals; applying said third electrical signal to the input of an operational amplifier, said operational amplifier having a feedback resistance which varies as a function of the temperature of air flowing through said conduit to produce a fourth electrical signal at the output of said operational amplifier, said fourth electrical signal being proportional to the mass of air flowing through said conduit; and applying said fourth electrical signal or a signal derived therefrom to a device for controlling the amount of fuel metered to said engine.

* * * * *